United States Patent [19]

Zimmerman

[11] Patent Number: 5,427,724
[45] Date of Patent: Jun. 27, 1995

[54] PROCESS FOR MAKING DECORATIVE ARTICLES

[76] Inventor: Rick Zimmerman, 1003 Faulkner Pl., Claremore, Okla. 74017

[21] Appl. No.: 28,408

[22] Filed: Mar. 9, 1993

Related U.S. Application Data

[63] Continuation-in-part of Ser. No. 660,511, Feb. 26, 1991, abandoned.

[51] Int. Cl.6 ............... B29C 39/12; B29C 59/18; B29C 70/82
[52] U.S. Cl. ............... 264/134; 264/230; 264/246; 264/294; 264/265; 264/267
[58] Field of Search ............ 264/230, 134, 510, 244, 264/245, 246, 266, 247, 162, 154, 229, 232, 265, 267, 294

[56] References Cited

U.S. PATENT DOCUMENTS

| | | | |
|---|---|---|---|
| 2,368,085 | 1/1945 | Barbieri | 264/230 |
| 2,533,609 | 12/1950 | Nolan et al. | 264/230 |
| 3,000,057 | 9/1961 | Swedlow et al. | 264/230 |
| 3,111,584 | 11/1963 | Appeldorn | 264/230 |

*Primary Examiner*—Jan H. Silbaugh
*Assistant Examiner*—Angela Ortiz
*Attorney, Agent, or Firm*—Head & Johnson

[57] ABSTRACT

A process for making decorative articles. The process includes heating a polymeric substance up to its glass transition temperature and stretching in at least one direction from a first size to a second size. The substance is allowed to cool in the stretched condition. The stretched polymeric substance is thereafter heated locally at an intensity until surface cracks appear therein to a desired depth. The interior area of the cracks in the polymeric substance is then treated in various ways. Finally, the polymeric substance is heated further until the polymeric substance begins to retreat to its original dimensions and the cracks close.

1 Claim, 4 Drawing Sheets

PROCESS FOR MAKING DECORATIVE ARTICLES

CROSS REFERENCE TO APPLICATION

This application is a continuation-in-part of U.S. patent application Ser. No. 07/660,511, filed Feb. 26, 1991, now abandoned, entitled "*Process for Making Decorative Articles*".

BACKGROUND OF THE INVENTION

1. Field of the Invention

The present invention is directed to making of decorative and utilitarian articles of polymeric material and the articles themselves.

2. Prior Art

The use of polymeric substances has reached nearly every area of daily life. Products made from polymeric substances can be found in homes, offices, and automobiles. The use of these materials is widespread because they are versatile, decorative, and provide durability and great strength for their weight.

Acrylic is a type of polymeric substance which is a resin that has many and varied applications. Acrylic is formed by the polymerization of its monomeric derivatives, most commonly esters or amides, of acrylic acid or methylacrylic acid.

Acrylic resins have been widely used in floor coverings, however, their main use is for optical purposes, such as lenses and instrument covers because of their transparency and resistance to age, light, weak acids, alkalies, alcohols, paraffins, and fatty oils. The exact formula for these acrylic compounds varies with the companies that manufacture them. Once these compounds are prepared, they are cast, formed, and finished to produce a material of high optical quality.

It is known in the art that once acrylic is stretched, it becomes stronger and more craze or resistant. Private industry and the United States government uses an acrylic type material that is stretched after it is cast and then finished to be transparent with very little optical distortion. One application for this material is as windows for airplanes, and is assigned the military specification number MIL-P-8184E. The process disclosed in this invention works well with this type of material, due to the fact that it is a polymer, and has been stretched in at least one direction.

SUMMARY OF THE INVENTION

This invention relates to a process for making decorative and utilitarian articles from thermoplastic polymers such as acrylic which have been stretched in at least one direction. Stretching of polymeric materials orients the chains of polymers to give the material better strength and craze, or crack, resistance. Stretching this material changes its dimensions; however, the volume remains the same. This may be accomplished by initially heating the material to its glass transition point and then stretching.

Through the application of the present invention, a decorative or utilitarian article is obtained which is made of a polymeric material that has induced cracks therein. This article can be made by taking a sheet of polymeric substance and heating it to its glass transition temperature. The substance is then stretched and allowed to cool. The stretched sheet of a polymeric substance will thereafter have decorative cracks therein. These cracks are obtained by locally heating the stretched polymeric material under a sufficient heat intensity for a duration of time to form cracks.

In one form of the invention, it is possible to confine the major portion of heating of the polymeric material to an area less than the total area of the piece of material worked. For example, a heart shaped cookie cutter can be placed on the material. Heat, then, is applied only to that area covered by the cookie cutter to produce cracks within a heart shaped boundary on the material.

The interior area formed by the cracks is then treated in various fashions before the further heat is applied.

If desired, a material can be added in the interior area of the cracks before the cracks are closed by further heating, thereby embedding it into the polymeric material. An example of this would be to put paint into the cracks. When the cracks are closed, the paint becomes embedded in the cracks producing a solid piece of material with painted lines inside of it.

An alternate method of treatment would be to introduce molten metal or wire in the interior area of the cracks before the cracks are closed by further heating.

A further alternate method of treatment of the interior area of the cracks involve recessing, hollowing out or drilling in the interior area of the cracks. After application of further heat, the recessed, hollowed or drilled out areas are sealed within the polymeric substance.

As a final step in the process of the invention, the induced cracks are closed. Closing of the cracks produces an aesthetic decorative article of chosen shape with a crack design therein. To close the cracks then, the polymeric material is reduced in size which closes up the cracks. This can be done by the further application of heat at an intensity and duration to permit the molecules to attempt to return to their original position.

DETAILED DESCRIPTION OF THE PREFERRED EMBODIMENTS

The present invention involves the heating and treating of thermoplastic polymeric compounds that have been initially heated and stretched in at least one direction, along with different additional processes, such as the addition of different materials at different points in the heating process in order to produce a decorative article.

Figure 1:
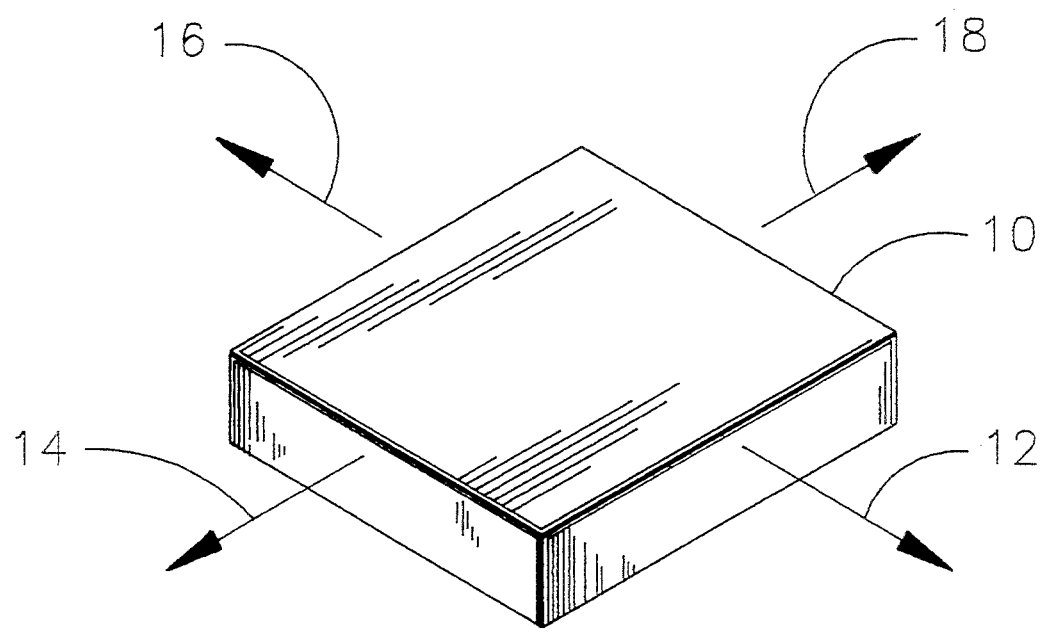
FIG. 1 is an isometric view of a piece of polymeric material before it is stretched and cracked.

FIG. 1 illustrates a piece of polymeric material 10, such as acrylic, which is of certain dimensions and is subject to being stretched bi-axially in the direction of force lines 12, 14, 16, and 18. When the polymeric substance is heated to its glass transition temperature, it becomes pliable and can be stretched by the addition of force upon it.

In the present example, the block of polymeric material 10 shown in FIG. 1 would be heated to its glass transition temperature and then stretched at force lines 12, 14, 16 and 18.

Once stretching is completed, the polymeric compound will have a reduced thickness and increased length and width. The volume of the polymeric material, however, remains the same after stretching as it was before stretching.

For example, a piece of acrylic sheet with the dimensions 3 inches thick, 72 inches wide and 72 inches long may be stretched bi-axially after heating to its glass transition temperature. The substance is then allowed to cool while in the stretched position. The resulting piece has a reduced thickness of 1 inch and increased width of 110 inches and increased length of 110 inches. The new dimensions are directly proportional to the energy and directional force used on the material. The amount of force necessary to stretch a material depends upon the type of material used.

Once the polymeric material has been stretched and allowed to cool, it is ready for cracks to be induced therein. When a stretched polymeric material is subject to heat thereafter locally, it makes an attempt to return to its prestretched form and dimensions. One reaction the material makes to this local heat is for surface cracks to appear in it. If the material were alternatively heated slowly and uniformly, with the entire piece of material being raised to its glass transition temperature approximately uniformly, and maintained at that temperature, reduction will occur over the entire piece of material at the same time with no cracks appearing at the surface.

The object of this process is to produce a decorative article that has surface cracks of a desired depth and pattern in it. In order to obtain this result, the material must be locally heated at an intensity necessary to raise it to its glass transition temperature quickly so that its surface begins its attempt to reduce itself to its pre-stretched form and dimensions while sufficient heat has not yet reached the molecules of the material that are interior and farther away from the heat source. When this is done, cracks appear on the surface of the material while the interior molecules that have not yet been heated remain frozen.

Increasing the temperature of the local heating changes the type of cracks that will be formed. When the polymeric substance is subject to a greater heat intensity, the cracks will get deeper and enlarge. The intensity of the heat determines the size of the cracks formed. For example, a piece of polymeric material ⅛ inch thick was heated uniformly over a Bunsen burner until surface cracks appeared in the polymeric material ⅛ inch deep. If this is the desired depth of the cracks, then heating is stopped.

Figure 2:
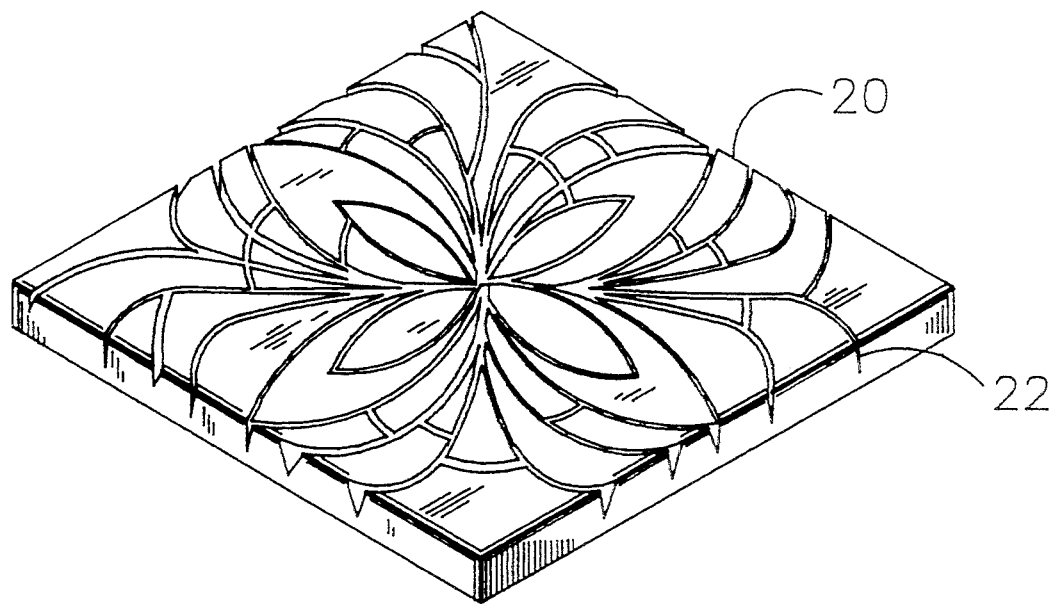
FIG. 2 is an isometric view of a piece of polymeric material after it has been bi-axially stretched and cracked.

FIG. 2 depicts a piece of polymeric material 20 which has initially undergone bi-axial stretching and cooling and then cracked through local heating. If the piece of material 10 from FIG. 1 is stretched along force lines 12, 14, 16, and 18, it would have the reduced thickness and increased length and width as material 20 of FIG. 2 depicts. If that same stretched piece of material is subject to an intensity of heat that will raise the surface molecules above the glass transition temperature of the material before the molecules deeper and on the other side of the material are raised to such temperature, cracks such as 22 of material 20 will appear. If deeper cracks are desired, a greater intensity of heat is applied. The more heat that is added, the deeper the cracks become. If the heat is concentrated on a given area, the cracks will be fewer and much deeper.

The cracking pattern in the material is a function of the manner in which it is stretched. Cracks form because of the stress created in the material as a result of being stretched. When a polymeric material is stretched, the polymeric chains align along the stress lines created in the material from the stretching. When the material cools after stretching, the molecules become frozen in that position, leaving a certain amount of stress in the material. Certain beneficial results are obtained through the presence of stress in the material. The strength of the material and its ability to resist impact, scratching, and crazing increases when stretched. When the material is again heated quickly above its glass transition temperature, as in the process disclosed herein, cracks appear along the stress lines.

The crack pattern of material 20 of FIG. 2 is believed to be a result of the bi-axial stretching of the material wherein stretching in one plane is greater than stretching in the other plane. The crack pattern shown would be produced if material 10 of FIG. 1 were stretched along force lines 12, 14, 16, and 18, and then subject to heat of sufficient intensity to form the depth of cracks shown in FIG. 2. The fact that the cracks bend is a result of it being stretched in two directions.

Figure 3:
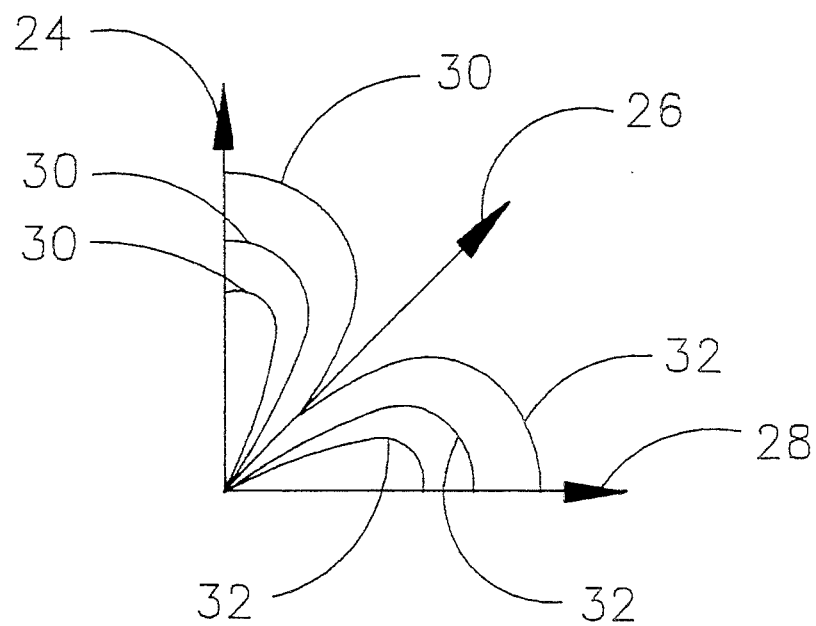
FIG. 3 is a force vector diagram depicting two perpendicular forces, their resultant force, and the reaction of this resultant force to unequal perpendicular forces.

FIG. 3 is a vector diagram depicting perpendicular forces 24 and 28 producing a resultant force 26. If a piece of polymeric material were stretched in the direction of force lines 24 and 28 with both forces being equal, and working upon the material in exactly equal fashion, straight cracks would appear along resultant force 26. However, due to the fact that either force 24 or force 28 will always be greater in practical application, the resultant force will bend toward the greater.

Figures 4, 5:
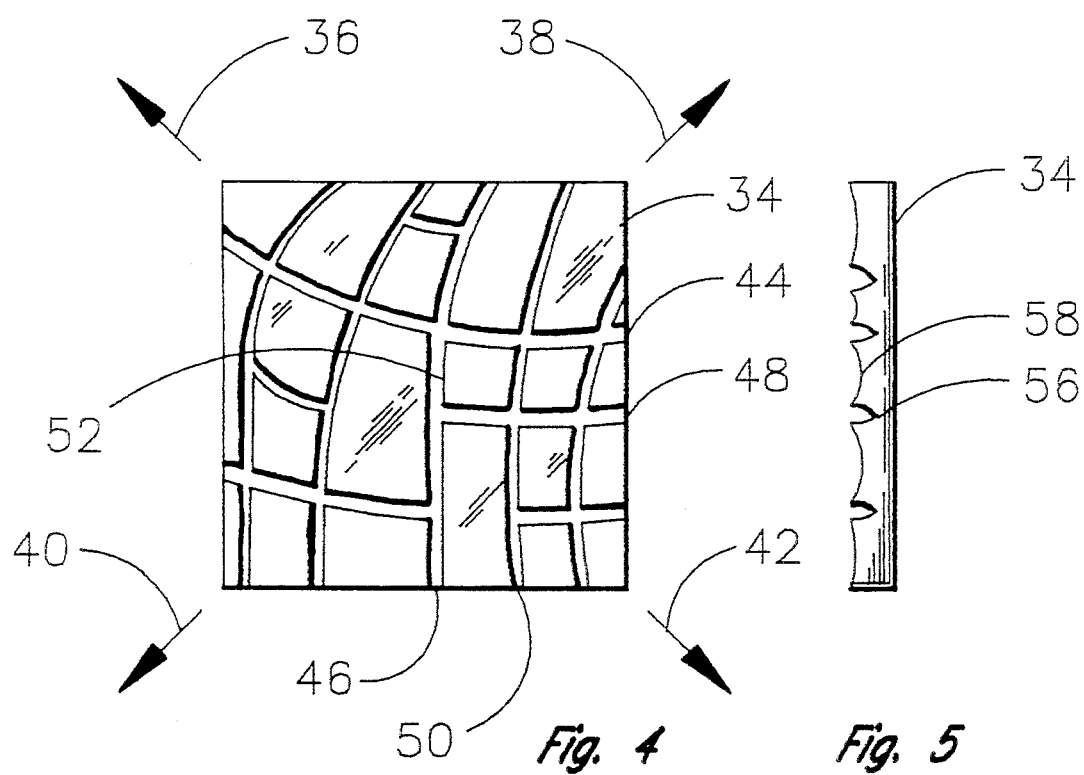
FIG. 4 is top view of a piece of polymeric material that has been bi-axially stretched and cracked.
FIG. 5 is a side view of the piece of the polymeric material of FIG. 4.

Perpendicular branching off of cracks is believed to be due to stretching in perpendicular directions. Material 34 of FIG. 4 depicts such a pattern. If material 34 is stretched along force lines 36, 38, 40, and 42, and then locally heated, a typical surface crack pattern such as on material 34 would be obtained. Cracks in the material intersect in a grid pattern. One would stretch the material in this fashion if generally square or rectangular shapes set off by cracks are desired. Shapes, such as 52 which are caused by the intersection of sets of parallel cracks 44 and 48, and 46 and 50, can be obtained from bi-axial stretching from forces approaching equal magnitude.

Cracking in this manner produces shapes of distinct decorative character. There will not be two crack patterns exactly alike, therefore each is unique. Cracks of this type and pattern create a unique decorative article which can be displayed as such.

Bi-axial stretching is also revealed by the concave appearance of the shapes set off by the cracks. FIG. 5, which is a side view of material 34 of FIG. 4, shows this concave appearance and the texture of the material after it is cracked. Shape 58 has such a concave surface set off by surface crack 56. The reason for the uneven surface of material 34 is that the material closest to the heat source is attempting to restore itself to its prestretched position, while the material away from the heat source is still frozen.

Figure 6:
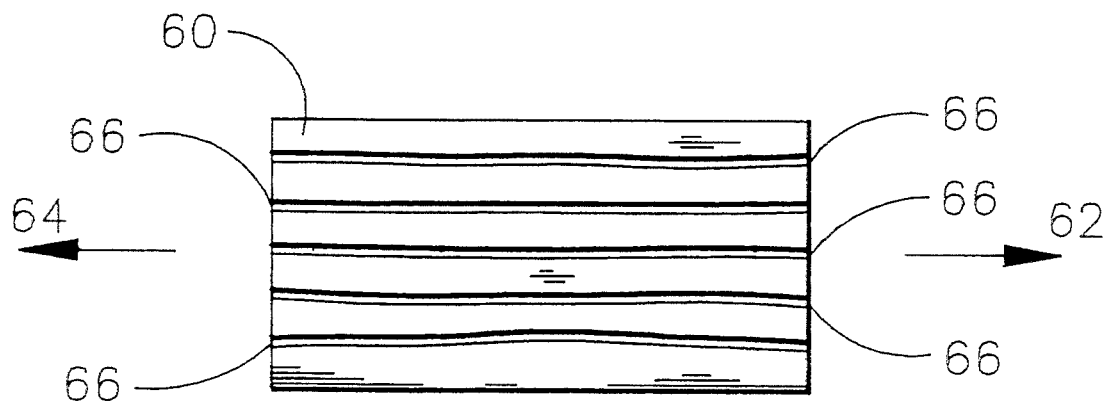
FIG. 6 is a top view of a piece of polymeric material that has been stretched on one axis only and then cracked.
Figures 7, 8:
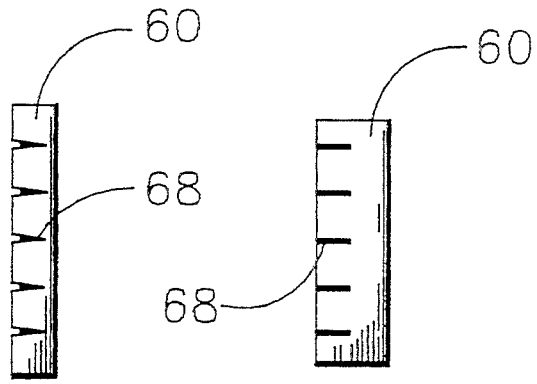
FIG. 7 is a side view of the piece of polymeric material of FIG. 6.
FIG. 8 is the same piece of material as in FIG. 7 after the cracks have been closed by further heating.

If a piece of polymeric material were subject to stretching along one axis only, calculations indicate that the crack pattern would be along that axis. Material 60 of FIG. 6 illustrates stretching along force lines 62 and 64 in one axis only. FIG. 6 illustrates that when material 60 has the addition of local heat, cracks, generally numbered 66, will appear along the axis of stretching only. The manner in which the material was initially stretched determines the crack pattern that will result from local heating. Almost any crack pattern may be obtained through proper selection of initial stretching. FIG. 7 shows a side view of material 60 of FIG. 6 and that crack 68 could be obtained from stretching along one axis.

The interior area of the cracks will be treated as will be described herein before a further application of heat.

Further continued heating of the cracked material causes the cracks to close as internal forces force the material toward its prestretched dimensions. Once cracks of a desired depth are obtained, heating may be continued at the same, or a lower, intensity until the entire piece of material is heated above the glass transition temperature of the material and the piece can be reduced to its prestretched dimensions. When this occurs, the cracks in the material close leaving the desired crack pattern in the material. FIG. 8 depicts the same piece of material 60 as in FIG. 7 after the cracks have been closed. Crack 68 is still present in the material although it has closed. A decorative crack pattern will still be visible in the material, however, the closed cracks give the article a different look.

A variation of the process is to color the surface of a transparent polymeric material before local heating. Thereafter local heat is supplied to crack and close the cracks. This would produce a unique stained glass appearance on the surface of the article. Color may be painted onto the surface of the polymeric material or it could be colored with a magic marker. Different colors could be placed on the surface of the material to more resemble stained glass.

A further step in the process is to treat the interior areas of the polymeric substance after the cracks have been induced. One type of treatment of the interior area of the cracks is to add material into the cracks and then close then so as to embed the added material inside the article. The material added into the cracks could be paint, molten metal, solid metal such as wire, or any combination thereof. Addition of material into the cracks enhances the aesthetic nature of the article. Embedding material in the cracks also might have utilitarian function such as a hanging mechanism for the piece or as a way to attach to another piece of polymeric substance.

Figure 10:
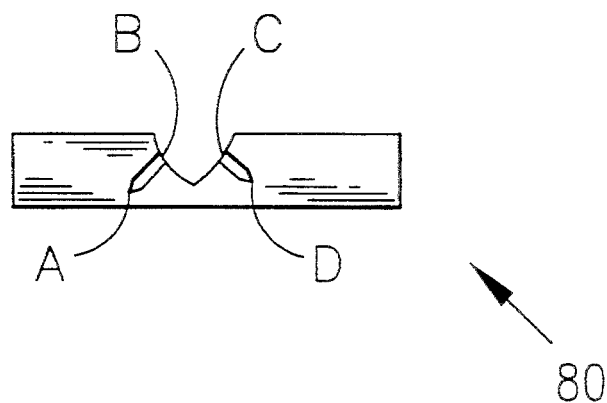
FIG. 10 is a sectional view of a piece of polymeric material wherein cracking has been induced by local heating and the interior area of the crack has thereafter been recessed or drilled.
Figure 11:
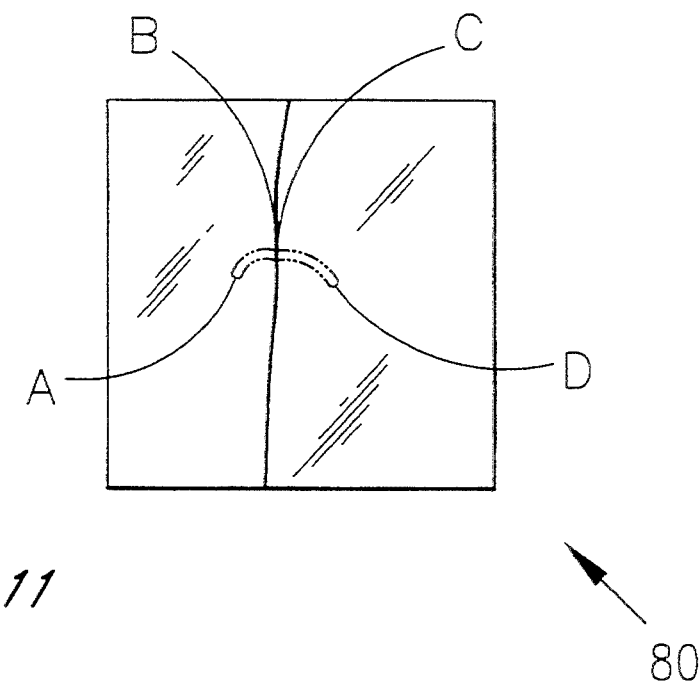
FIG. 11 is a sectional view of the piece of polymeric material shown/in FIG. 10 after further heating.

Another alternate treatment of the interior area of the cracks involves hollowing out, receiving or drilling of the interior area. FIGS. 10 and 11 illustrate this process with polymeric substance 80. Once the surface cracks have been induced by local heating, the cracks may be drilled into as seen in FIG. 10. Recessed areas AB and CD are seen in FIG. 10. This produces a hollow area where the drilling has occurred. The polymeric substance is shown after final heating in FIG. 11. The final heating will trap the hollowed out area within the material.

Figure 9:
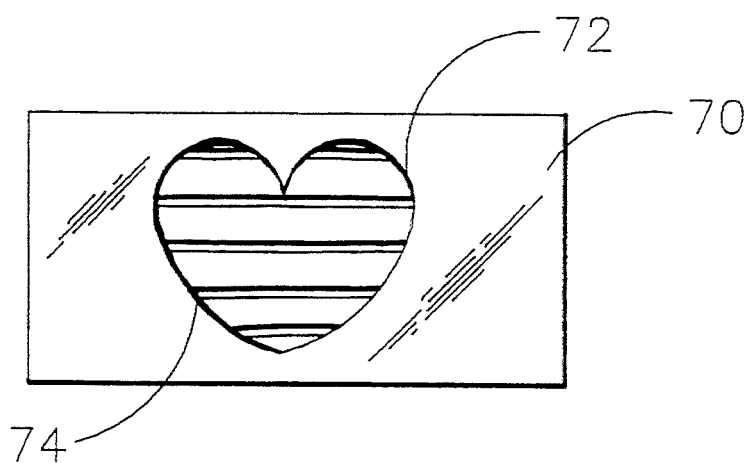
FIG. 9 is a top view of a piece of polymeric material on which cracking has been confined to a heart shape.

A further variation is to confine the heat applied to a polymeric material to cause the surface cracks to be confined to a specified pattern. Cracking will then only occur inside of that specified pattern. FIG. 9 illustrates how another piece of material 70 which been stretched along one axis only may be utilized. Heat would be applied to material 70 confined to a heart shaped pattern such as by placing a heart shaped cookie cutter on material 70. Cracks, such as crack 74 should appear on the surface of material 70 inside the pattern of the cookie cutter while no cracks would appear elsewhere on the material. Material 70 could then be heated again so that crack 74 would close.

This variation can be used in combination with other variations as well. Material 70 could have been stretched in any manner to produce any desired crack pattern within the heart shaped pattern. In addition, material could be added into the cracks and then material 70 could be heated to close the cracks thereby embedding the material into the article; or the surface of the article could be colored with marker to produce a stained glass appearance inside the cookie cutter pattern. These cracks could be closed again with heating.

Figure 12:
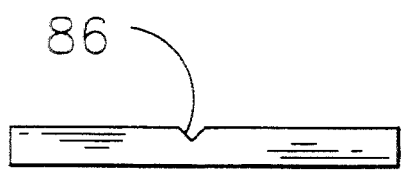
FIG. 12 is a sectional view of a piece of polymeric material treated in accordance with an alternate process.
Figure 13:
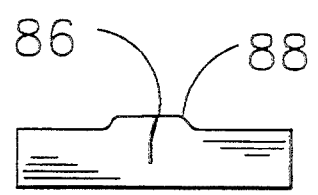
FIG. 13 is a sectional view of the piece of polymeric material seen in FIG. 12 after further heating.

An alternate process may be employed to produce a decorative or utilitarian article as seen in FIG. 12 and 13. A polymeric substance 84 is initially heated to its glass transition temperature and then stretched in at least one direction from a first size to a second size. The substance is allowed to cool in the stretched condition as previously described.

Thereafter, a scratch 86, cut or the like is inflicted on the surface of the substance as seen in FIG. 12. Heating of this area where the scratch has occurred produces a surface swelling 88 near the cracks as best seen in FIG. 13. The scratch or cut serves to open the polymeric material up to allow increased heat penetration where the scratch or cut is inflicted. Heat penetration is easier because the material is thinner where the scratch occurs. Further heating will close the cracks.

Polymeric material has proven well adapted to the processes disclosed in the invention. A piece of polymeric material may be stretched in at least one direction thereby increasing at least one dimension by a factor x. The stretched polymeric material is then cut to any desired shape, heated to cause cracking in the polymeric material, heated again to allow the cracks to close thereby reducing its size by that same factor x.

Acrylic is especially suitable for this application because it is a polymeric substance which possesses the ability to be stretched and then able to reduce its dimension again upon the addition of heat. Furthermore, the optical clarity of acrylic makes it especially suitable for such applications such as applying color to the surface of the material, forming cracks, and then closing the cracks to obtain a unique stained glass look.

One specific type of acrylic is exceptionally well suited to be subject to the process disclosed in this invention due to the fact that it is already stretched. This type of acrylic material is given the military specification number MIL-P-8184E, and possesses the characteristics outlined in that specification. This material is well suited because of its clarity and transparency which what is desired when used to produce an article with a stained glass appearance, for example.

The combination of the many subprocesses disclosed herein creates many different and unique decorative articles. With all of the combinations available, the range of plain to highly intricate products can be obtained.

In summary, the present invention provides a process whereby control may be exercised to produce a decorative or utilitarian object. The type of cracks, the depth of cracks, the treatment of the interior area of the cracks may all be controlled to produce a desired article.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claims, including the full range of equivalency to which each element thereof is entitled.

What is claimed is:

1. A process for making decorative articles, comprising:
   (a) heating a polymeric substance up to its glass transition temperature and stretching said substance in at least one direction from a first size to a second size;
   (b) allowing said polymeric substance to cool in said stretched condition;
   (c) heating the stretched polymeric substance locally at an intensity until surface cracks appear therein to a desired depth;
   (d) treating an interior area of said cracks in said polymeric substance including:
   introducing molten metal or wire material into said cracks in said polymeric substance; and
   (e) then further heating the polymeric substance until the polymeric substance begins to retreat to its original dimensions and said cracks close, and conducting said further heating with said molten metal of wire material in said cracks thereby entrapping the molten metal or wire material inside said polymeric substance.

* * * * *